W. SMOLLEY.
CORN GATHERING OR HARVESTING MACHINE.
APPLICATION FILED SEPT. 12, 1918.
1,347,559.
Patented July 27, 1920.
3 SHEETS—SHEET 3.
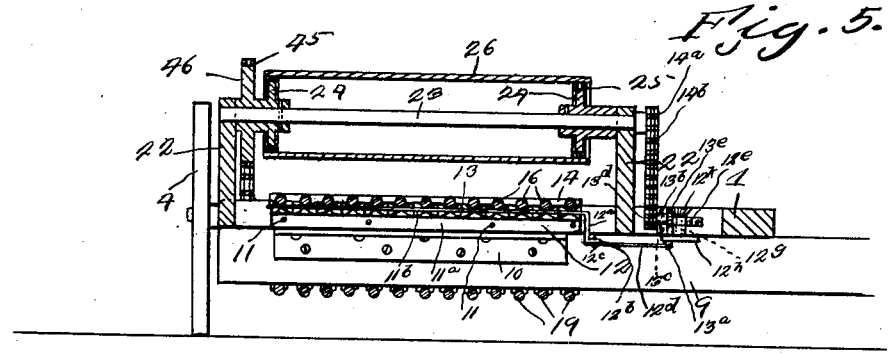
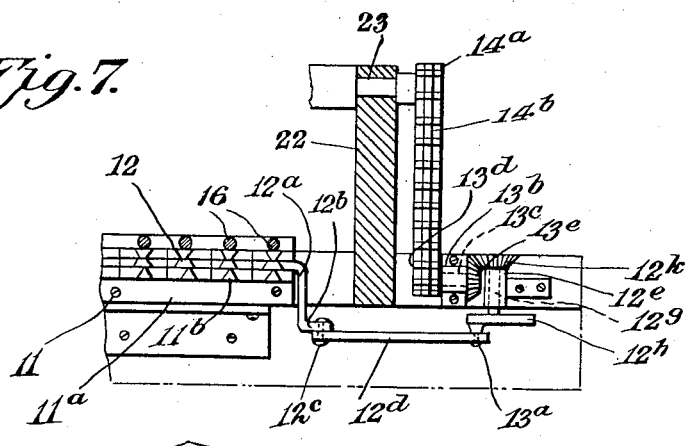
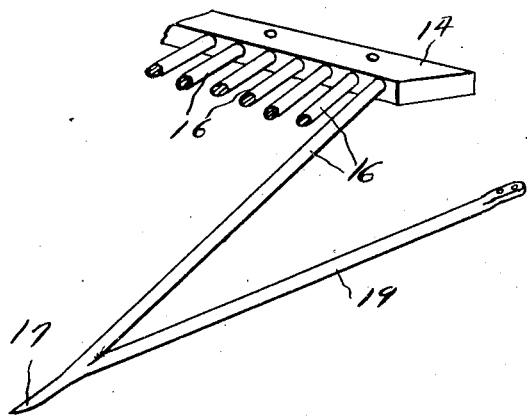
Witnesses
Inventor
W. Smolley
By D. Swift & Co
Attorneys

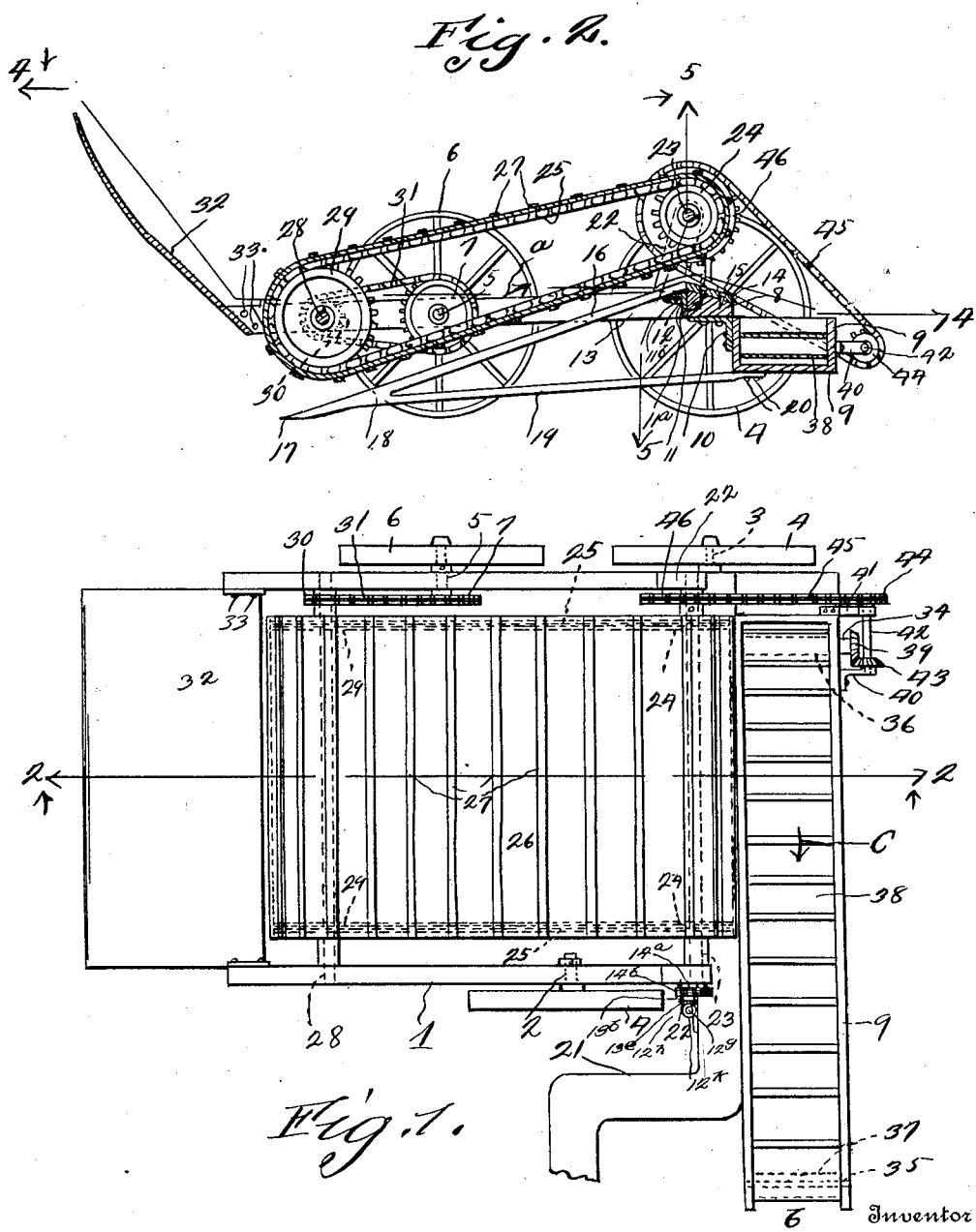

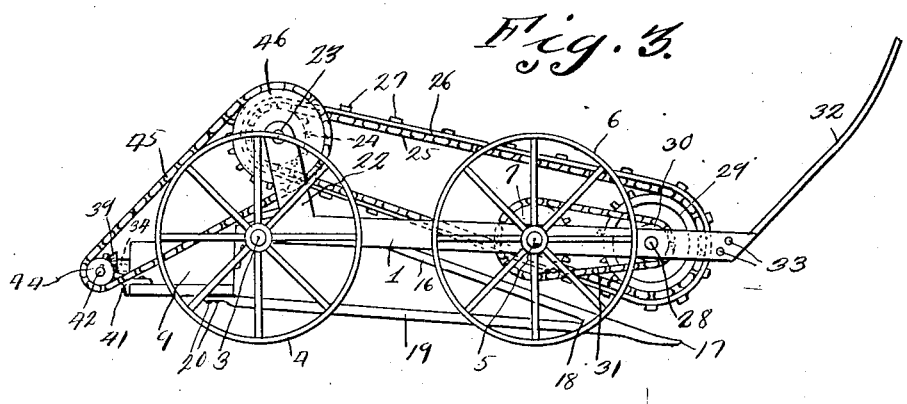
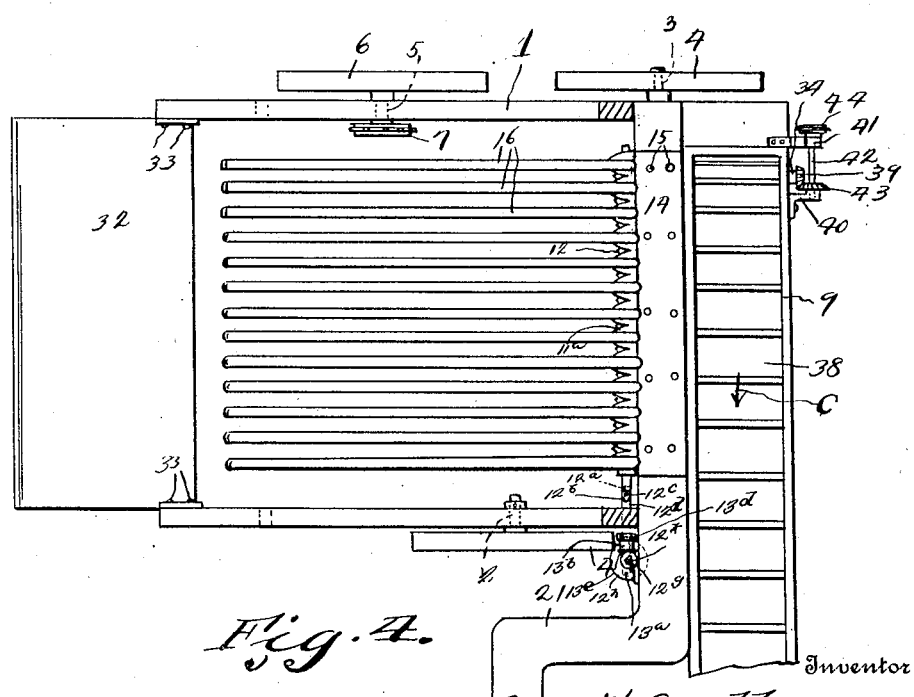

UNITED STATES PATENT OFFICE.

WAYNE SMOLLEY, OF BROOKVILLE, INDIANA.

CORN GATHERING OR HARVESTING MACHINE.

1,347,559.  Specification of Letters Patent.  Patented July 27, 1920.

Application filed September 12, 1918. Serial No. 253,766.

*To all whom it may concern:*

Be it known that I, WAYNE SMOLLEY, a citizen of the United States, residing at Brookville, in the county of Franklin, State of Indiana, have invented a new and useful Corn Gathering or Harvesting Machine; and I do hereby declare the following to be a full, clear, and exact description of the invention, such as will enable others skilled in the art to which it appertains to make and use the same.

This invention relates to the improved gathering or harvesting machine, for removing the ears of corn from the stalks while standing in the field.

The invention aims to provide a machine of this kind provided with a corn stalk deflecting device, in order to slant the stalks forwardly and downwardly under the machine.

The invention further aims to provide a series of spaced members under a conveyer, for assisting in pulling or gathering or picking the ears of corn from the stalks, as they are bent downwardly under the machine.

The invention further aims to provide a feeding conveyer having its under part operated rearwardly, for instance just the opposite to the direction in which the machine is traveling, to feed the tops or upper portions of the stalks rearwardly and toward a cutting element, whereby the ears and the upper portions of the stalks may be severed.

And a further object of the invention consists in the provision of a conveyer for carrying the ears of corn laterally to a receptacle or wagon adapted to be driven adjacent to the machine, or if desired the ears may be conveyed to husking rolls (not shown).

In practical fields the details of construction may necessitate alterations falling within the scope of what is claimed.

The invention comprises further features and combination of parts as hereinafter set forth shown in the drawings and claimed.

In the drawings:—

Figure 1 is a plan view of the improved corn gathering or harvesting machine constructed in accordance with the invention.

Fig. 2 is a longitudinal sectional view on line 2—2 of Fig. 1.

Fig. 3 is a view in side elevation of the improved machine from the opposite side to that shown in Fig. 2.

Fig. 4 is a sectional plan view on line 4—4 of Fig. 2.

Fig. 5 is a vertical sectional view on line 5—5 of Fig. 2.

Fig. 6 is a detail perspective view of a portion of the supporting strip for the gathering and corn picking members.

Fig. 7 is an enlarged detail view of the cutter bar drive mechanism.

Referring more especially to the drawings 1 designates a suitable frame which may be any suitable shape preferably rectangular, and on stub axles 2 and 3 suitable supporting wheels 4 are journaled, whereby the rear part of the frame may be supported. A stub axle 5 is carried by the frame, and journaled on said axle is an additional supporting wheel 6 for the forward part of the frame. The stub axle 5 carries a sprocket 7. The rear part of the frame is provided with a transverse beam 8, there being a trough 9 suspended from this beam 8 by means of the angle plate or bracket 10. Secured to the forward face of the beam 8 by screws 11 is a finger bar $11^a$, which is angular in cross section, and this finger bar has a guide $11^b$, in which a cutter bar 12 reciprocates. One end of the cutter bar is provided with a downwardly turned arm $12^a$, the ear $12^b$ of which is pivoted at $12^c$ to a pitman $12^d$. Mounted in a bearing $12^e$ of the frame 1 is a shaft $12^g$, the lower end of which has a disk $12^h$ and its upper end a bevel gear $12^k$. The pitman $12^d$ is pivoted at $13^a$ to the disk $12^h$. Also fixed to the frame 1 is a bearing $13^b$ in which a shaft $13^c$ is mounted. One end of the shaft $13^c$ has a sprocket $13^d$, and its other end is provided with a bevel gear $13^e$ meshing with the bevel gear $12^k$. Mounted upon the shaft 23 at its end opposite the sprocket 46 is a sprocket $14^a$, about which the sprocket chain $14^b$ travels. The chain in turn travels about the sprocket $13^d$. It is obvious when the shaft 23 rotates, power is transmitted to the cutter bar, which will shear or cut the upper portions of the stalks, or the ears therefrom, as the stalks are guided in their movement toward the cutter by the finger bar. A plate or strip 14 is secured by screws 15 to the upper face of the beam 8, and this strip or plate has secured to its forward edge in any suitable manner (not shown) a plurality of spaced rods or gathering members 16. These rods or gathering members incline downwardly and forwardly, whereby their sharpened ends 17 may engage the upper surface of the ground or soil. Integral with said rods or gathering members as shown at 18 are brace rods 19, which extend at acute angles to the rods 16 and rearwardly and have their rear extremities secured at 20 to the under face of the trough 9 as at 20, thereby rigidly bracing the rods or gathering members 16. As the machine is driven forward, since the projection 21 is designed to be connected in any suitable manner (not shown) to a field-husker (not shown), the stalks will pass between the rods or gathering members 16, and since the spaces between said rods are only wide enough for the stalks, the ears will be pulled from the stalks, about the time the upper portion of the stalks and the ears reach the cutter bar. Rising upwardly from the rear parts of the sides of the frame are standards 22, in bearings of which the shaft 23 is mounted. Sprockets 24 are mounted upon the shaft 23, and are engaged by sprocket chains 25 of a conveyer. This conveyer comprises the slats 27 which transversely connect the chains 25. This conveyer also includes a canvas belting 26 which may or may not be used. In other words the canvas belting may be dispensed with if desired. In bearings of the forward portions of the sides of the frame a shaft 28 is mounted, which also has sprockets 29, about which the chains 25 pass. One end of the shaft 28 has an additional sprocket 30, which is engaged by the sprocket chain 31, which also passes about the sprocket 7, whereby motion may be imparted to the conveyer, in the direction of the arrow $a$. A deflecting shield or plate 32 is secured to the forward ends of the sides of the frame as at 33, thereby not only bracing the sides to hold them rigid but also constituting means to deflect the stalks downwardly and under the conveyer. Since the conveyer moves in the direction of the arrow $a$, the movement being at a slightly greater speed than the forward travel of the machine, the upper portions of the stalks will be moved rearwardly at a greater speed than the forward movement of the machine, whereby they will be held in position to be sheared or severed by the cutter bar 12, and the ears will, at the same time be severed or pulled off. It is obvious that should any loose ears be lying on the ground, they will be gathered by the rods 16, and by means of the conveyer will be fed upwardly on the rods, and over the beam 8 into the trough 9. Mounted in the sides of the trough 9 are shafts 34 and 35. The shaft 34 is provided with a fixed roller 36, while the shaft 35 is provided with a loose roller 37, and over which rollers a suitable conveyer 38 travels whereby the ears and the like will be conveyed laterally to a corn husker or if so desired emptied into a suitable wagon (not shown) which may be driven at the side of the machine. One end of the shaft 34 has a bevel gear 39. Mounted in bearings of the brackets 40 and 41 is a shaft 42 on one end of which is secured a bevel gear 43, said gear 43 being in mesh with the bevel gear 39. The other end of the shaft 42 is provided with a sprocket 44, which is engaged by a sprocket chain 45, which sprocket chain extends over the sprocket 44 and over a sprocket 46 carried by one end of the shaft 23. It is obvious that since the conveyer chains 25 move in the direction of the arrow $a$, power is transmitted to the conveyer 38 in the direction of the arrow $c$ by means of the bevel gears 39 and 43 and the sprocket chain 45.

The invention having been set forth what is claimed as new and useful is:—

1. In a gathering machine, the combination with a substantially rectangular frame, said frame being supported by wheels in a substantially horizontal plane, downwardly and forward extending spaced fingers having their forward ends disposed adjacent the ground, rearwardly extending braces for said fingers and extending in substantially a horizontal plane, cutting mechanism adjacent the under surface of the rear ends of the fingers, said fingers forming means for separating the stalk from each other during a gathering operation and also forming means for guiding the ears toward the cutting mechanism, an endless conveyer disposed on an inclined plane over the fingers and means whereby said conveyer will be moved at a greater speed than the speed of advance of the machine as a whole so that the ears of corn will be passed rearwardly to the cutter bar without uprooting the stalk as a whole.

2. In a gathering machine, the combination with a substantially rectangular frame supported on wheels in a substantially horizontal plane, of downwardly and forwardly extending spaced fingers having their forward ends disposed adjacent the ground, rearwardly extending braces for said fingers and extending rearwardly in a substantially horizontal plane, cutting mechanism adjacent the under surface of the rear ends of the fingers, said fingers forming means for separating the stalks from each other and engaging the ears of corn below the point of jointure to the stalk and guiding the ear and stalk in its rearward movement, said fingers also forming means for straightening up bent stalks which may have become bent from weather conditions, an endless conveyer disposed on an inclined plane over the fingers, means for operating the conveyer at a greater speed than the speed of advance of the machine as a whole, thereby allowing the stalks to reach a substantially vertical position before they reach the cutting mechanism, and a transversely disposed upwardly and forwardly extending deflection plate carried at the forward end of the frame and extending upwardly from the forward end of the endless conveyer whereby the straight stalks will be inclined forwardly before they become engaged between the gathering fingers.

In testimony whereof I have signed my name to this specification in the presence of two subscribing witnesses.

WAYNE SMOLLEY

Witnesses:
 HARRY FERRIS,
 FRANK S. MASTERS.